(12) United States Patent
Dholakia et al.

(10) Patent No.: US 8,269,962 B2
(45) Date of Patent: Sep. 18, 2012

(54) ENHANCED SPECTROSCOPIC TECHNIQUES USING SPATIAL BEAM SHAPING

(75) Inventors: Kishan Dholakia, Fife (GB); Iain Cormack, Fife (GB); Michael Mazilu, Fife (GB)

(73) Assignee: The University Court of the University of St. Andrews, St. Andrews (GB)

( * ) Notice: Subject to any disclaimer, the term of this patent is extended or adjusted under 35 U.S.C. 154(b) by 328 days.

(21) Appl. No.: 12/532,723

(22) PCT Filed: Mar. 10, 2008

(86) PCT No.: PCT/GB2008/000840
§ 371 (c)(1),
(2), (4) Date: Sep. 23, 2009

(87) PCT Pub. No.: WO2008/107702
PCT Pub. Date: Sep. 12, 2008

(65) Prior Publication Data
US 2010/0328657 A1    Dec. 30, 2010

(30) Foreign Application Priority Data

Mar. 8, 2007  (GB) .................................. 0704491.0

(51) Int. Cl.
*G01J 3/44*  (2006.01)

(52) U.S. Cl. ........................................................ 356/301
(58) Field of Classification Search .................. 356/301
See application file for complete search history.

(56) References Cited

U.S. PATENT DOCUMENTS

| 4,247,770 | A | * | 1/1981 | Welch | 356/301 |
|---|---|---|---|---|---|
| 5,952,035 | A | | 9/1999 | Erb et al. | |
| 6,388,788 | B1 | | 5/2002 | Harris et al. | |
| 6,897,950 | B2 | * | 5/2005 | Li et al. | 356/301 |
| 7,245,369 | B2 | * | 7/2007 | Wang et al. | 356/301 |
| 2001/0045529 | A1 | | 11/2001 | Iketaki et al. | |
| 2003/0016350 | A1 | * | 1/2003 | Cheng et al. | 356/301 |
| 2003/0068836 | A1 | * | 4/2003 | Hongo et al. | 438/30 |
| 2006/0184037 | A1 | | 8/2006 | Ince et al. | |
| 2006/0250613 | A1 | | 11/2006 | Demuth et al. | |

FOREIGN PATENT DOCUMENTS

WO    WO 2006/130728 A2    12/2006

OTHER PUBLICATIONS

UK Search Report for corresponding GB 0704491.0, completed Jul. 10, 2007 by Simon Colcombe.

* cited by examiner

*Primary Examiner* — Layla Lauchman

(57) ABSTRACT

A Raman spectrometer comprising means for illuminating a sample with a shaped laser beam and a detector that is operable to detect light that is reflected from or transmitted through a sample. Preferably, the shaped laser beam has a dark spot at its center.

9 Claims, 7 Drawing Sheets

50 →

|  | Gaussian | LG (l=1) | LG (l=3) | hG (Ø=0.5 $w_0$) | hG (Ø= $w_0$) |
|---|---|---|---|---|---|
| Intensity profile in the focal spot |  |  |  |  |  |
| Fluorescence (coating) | 100% | 81% | 51% | 90% | 65% |
| Fluorescence (bulk) | 100% | 78% | 47% | 87% | 60% |
| Raman (sample) | 100% | 93% | 80% | 92% | 96% |

ENHANCED SPECTROSCOPIC TECHNIQUES USING SPATIAL BEAM SHAPING

TECHNICAL FIELD

The present invention relates to a system and method for improving the signal to noise ratio of focused spectroscopic techniques by using specifically engineered spatial beam shaping to enhance their performance. This enhancement is demonstrated in the case of Raman spectroscopy.

BACKGROUND OF THE INVENTION

Raman spectroscopy is a powerful method for obtaining a chemical signature delineating the internal molecular structure of a sample. The applications and principles of Raman spectroscopy are well known and thus will not be described here in detail. Raman spectroscopy is an in-elastic light scattering technique that that uses the Raman effect. In a typical Raman spectroscopy system, an excitation laser illuminates a sample, for example a molecular or cellular sample, containing various molecules that provide the Raman scattering signal. The light that is scattered from the sample exhibits a frequency shift that reflects the energy of specific molecular vibrations within the sample. This provides a detailed chemical composition of the sample—a chemical fingerprint.

Because it may be applied to samples over a wide size range from single cells through to intact tissue, Raman spectroscopy has significant potential in biomedical science, e.g. in the early detection of disease. However, a major challenge of Raman spectroscopy is that the signal is very weak and may be masked by background fluorescence that is generated from components within the optical arrangement. as well as the sample. In particular, fluorescence can be generated from coatings on the surface of the optical components and/or within the optical components themselves. Considerable effort has been made to enhance the ratio of signal to background noise for Raman spectroscopy. Some benefits can be achieved by increasing the acquisition time typically to several minutes. However for live cells, long acquisition times can cause damage due to extended irradiation by the Raman excitation laser.

FIG. 1 shows a typical spectroscopy microscope setup 2 including a light source 4, an objective lens 6 for focusing light from the source onto a sample plane 8, a collimator 10 to collimate the light from the sample plane 8, and an additional lens 12 to focus the collimated light onto a detector 14 that measures the spectrum. The Raman signal will be generated at the sample plane 8 and efficiently collected onto the detector 14. Additionally fluorescence generated from optical system will be collected with varying efficiency. The path of fluorescent light generated from one specific point in the objective lens is shown. The amount of fluorescence collected and detected depends on the total fluorescence initially generated, the distance from the paraxial axis and the distance from the focal plane. The closer the fluorescence point is to the paraxial axis and/or to the focal plane the more fluorescence is detected. The amount of fluorescence detected is also dependant upon the intensity of the excitation, the beam profile and the collection efficiency. For example, when exciting with a Gaussian beam profile, the peak intensity is centrally situated causing the largest amount of fluorescence to be generated down the centre of the paraxial axis, allowing it to be efficiently collected by the detector. This is a problem.

SUMMARY OF THE INVENTION

According to one aspect of the present invention, there is provided a method for obtaining an improved Raman signal from a sample by spatially shaping the beam.

By shaping the excitation beam, for example by forming an annular light field, the present invention can significantly reduce the background fluorescence that commonly swamps Raman scattering signals, thereby providing enhanced sensitivity. This helps both reduce the need for prolonged acquisition as well as the overall noise of the Raman signal. This is a simple, robust technique that can be easily implemented in any Raman configuration.

Preferably, the beam is shaped prior to illumination of the sample and/or prior to passing through one or more focusing elements for focusing it onto the sample.

The beam may be shaped, so that its intensity maximum propagates away from the spectroscopic optical axis.

The beam may be shaped so that it is annular and/or has a dark spot at its centre.

The shaped laser beam may be one of: a Laguerre Gaussian; a Gaussian beam with a hole at its centre; a Hermite-Gaussian beam and a Bessel beam.

The spectroscopy may be Raman spectroscopy, for example Raman scattering, tip-enhanced Raman scattering (TERS), Surface-enhanced Raman scattering (SERS).

According to another aspect of the present invention, there is provided a spectroscopy system comprising means for illuminating a sample with a shaped laser beam and a detector that is operable to detect light that is reflected from or transmitted through a sample, wherein the laser beam is shaped to minimize noise and/or background fluorescence. The shaped laser beam may have an intensity maximum that propagates away from the spectroscopic optical axis. The shaped laser beam may have a dark spot at its centre. The shaped laser beam is annular. The shaped laser beam may be one of: a Laguerre Gaussian; a Gaussian beam with a hole or dark spot at its centre and a Hermite-Gaussian beam.

BRIEF DESCRIPTION OF THE DRAWINGS

Various aspects of the invention will now be described by way of example only and with reference to the accompanying drawings, of which:

FIG. 2 is a theoretical plot of intensity profiles for a series of different beams, together with theoretical calculations of the background fluorescence collected;

DETAILED DESCRIPTION OF THE DRAWINGS

Figure 1:
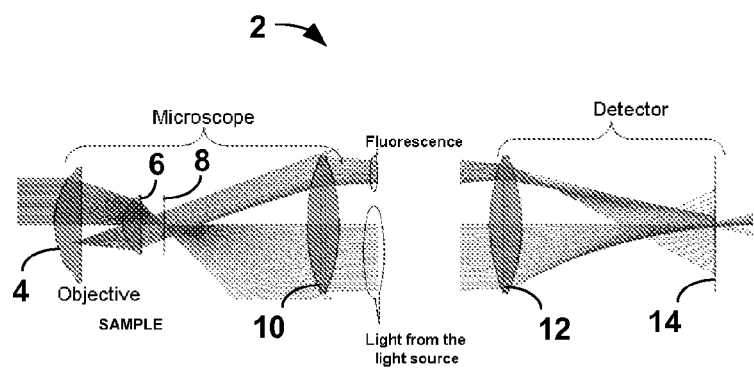
FIG. 1 illustrates an example of spectroscopy microscope setup.

In accordance with the present invention, a specially engineered spatial beam profile is used as the illuminating source for spectroscopic techniques, and in particular the Raman based spectroscopic techniques. Using, for example, an annular beam in the arrangement of FIG. 1 reduces background fluorescence because it moves the maximum intensity part of the beam away from the central and so widest parts of the optical components. This means that less overall fluorescence is generated and collected by the detector. This behaviour is largely independent of the optical configuration used to generate and collect the Raman signal.

Any form of engineered spatial beam could be used so long as its greatest intensity propagates away from the paraxial axis. For example, any annular beam, such as a Laguerre Gaussian (LG), a holey Gaussian (hG) or higher order Hermite Gaussian beam could be used. FIG. 2 shows, theoretically, the overall collection efficiency 50 for a Laguerre Gaussian (LG) and a holey Gaussian (hG). In this case, it was assumed that the hG beam was formed by placing an obstruction in the beam path of a Gaussian beam before the microscope. The size, shape and position of the obstruction are optimized to suit the specific optical configuration.

Two main sources of fluorescence were considered separately, these being the fluorescence caused by the coating on the optical components and fluorescence caused by the bulk glass. The data of FIG. 2 shows that annular beams are beneficial over a Gaussian profile for reducing background fluorescence. This is because the annular beam allows the peak excitation intensity to move away from the paraxial axis so that it is evenly distributed a set distance around the axis. As a consequence, any generated fluorescence is less effectively collected than a beam having a Gaussian profile.

Laguerre Gaussian and holey Gaussian (hG) beam profiles have different cross sections when focused onto the sample plane. This is also outlined in FIG. 2, which shows that the holey Gaussian has a bright centre at the sample plane, whereas the dark centre of LG mode is retained over the full length of the propagating mode. This demonstrates, for given applications, a distinct advantage an hG beam has over an LG beam. This is because it means that for an hG beam the Raman signal from the sample will be generated directly upon the paraxial axis, where its detection is most efficient. Additionally, away from the sample, annular beams inherently generate very small amounts of fluorescence close to the paraxial axis. On the other hand having a dark centre at the focal point, like that from an LG beam, distributes the excitation beam over a larger area, reducing photo-induced damage in the sample.

Figure 3:
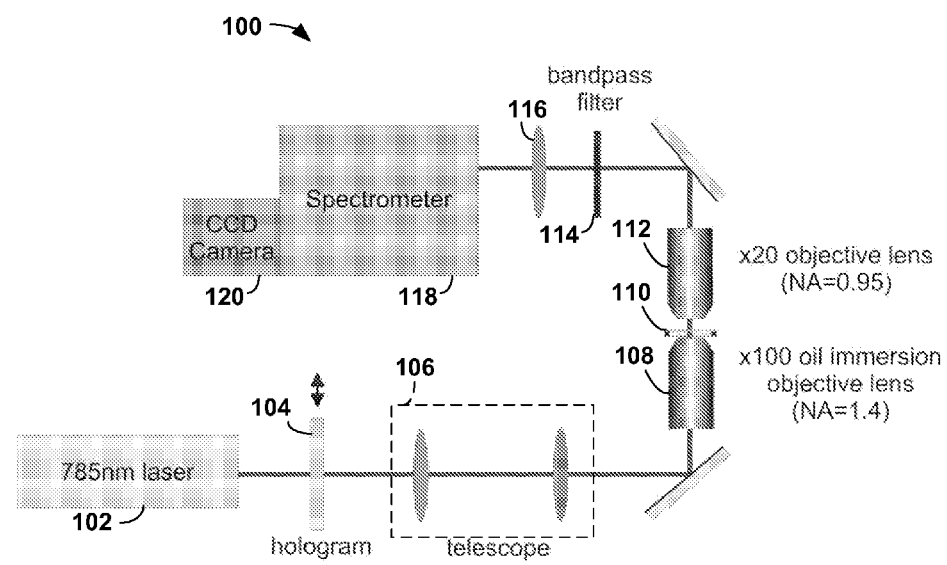
FIG. 3 is a block diagram of an experimental arrangement that was used for testing the effects of beam shaping on Raman spectroscopy.

FIG. 3 shows an optical arrangement 100 for demonstrating how an engineered beam profile reduces background fluorescence. Standard optics, not specifically designed to reduce fluorescence were used. For the experiments, the Raman excitation beam was provided by a high power laser diode 102 (Tui Optics TA100) operating at a wavelength of 780 nm. A hologram 104 was used for creating a shaped optical beam. This was selected so as to create a LG beam (l=3) when in its central position or a Gaussian profile by traversing it away from the central position, allowing it to act as a standard grating. To form a holey Gaussian a small obstruction was placed in the beam so that it was imaged onto the back aperture of the objective lens. A telescope 106 was used to expand the beam so to maximise the numerical aperture (NA) of the objective lens 108 while at the same time ensuring there was no clipping of the beam for all three profiles. An oil immersion high NA objective lens (Nikon ×100, NA=1.4) 108 was used to focus onto a sample chamber 110 while a lower NA (Nikon ×20, NA=0.9) collecting objective lens 112 was used to collimate the Raman signal. By doing this only light originating from the central portion of the sample chamber was collected.

The sample chamber 110 was formed using an 80 µm deep vinyl spacer between a quartz microscope slide and a fused silica coverslip (120 µm in thickness). A fused silica coverslip was preferred over a lower fluorescing quartz coverslip as it helped increase extraneous signals deriving away from the sample. As a sample, a dilute solution of 10 µm polymer microspheres in distilled water was used. A zero degree holographic notch filter 114 was placed after the collecting objective 112 to remove the excitation light. The light was then finally focussed through the 100 µm entrance slit 116 of the spectrometer (Jobin Yvon Triax 550) 118. The Raman scattering spectrum was collected by a peltier cooled CCD camera (Symphony OE STE Jobin Yvon) 120. The power of the laser beam entering the first objective lens 108 was maintained constant (13 mW) for all three profiles.

Figure 4:
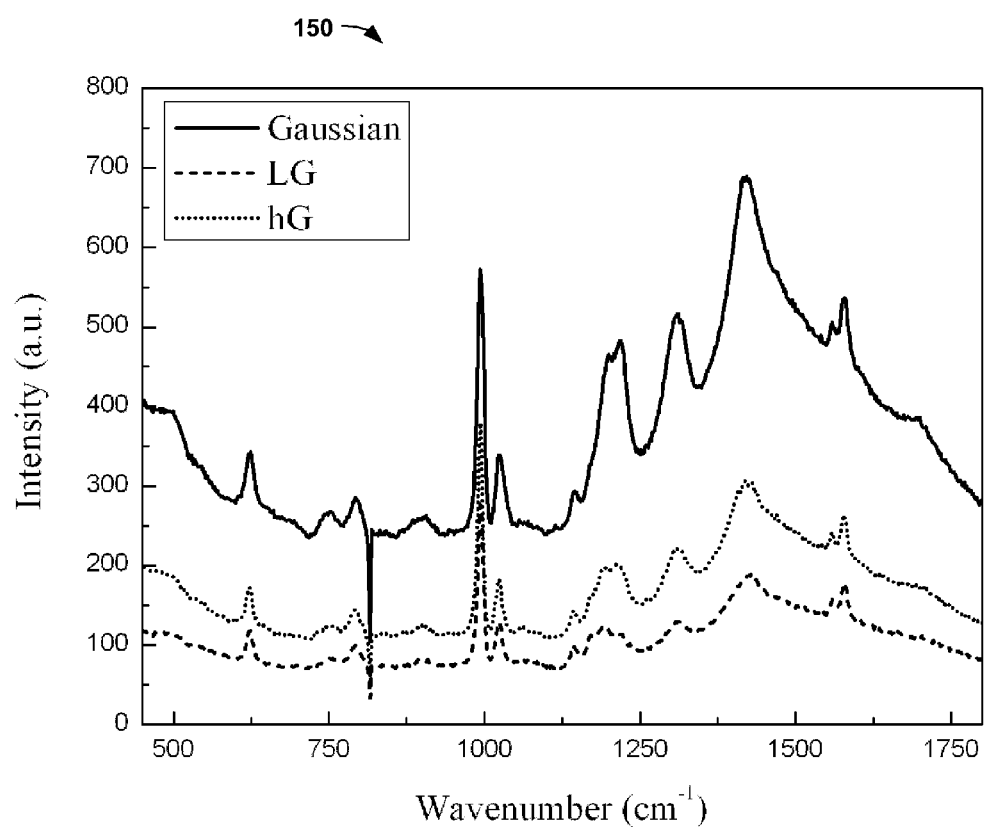
FIG. 4 shows Raman spectra for three different beam profiles.

To allow statistical information to be derived from measurements 125 spectra were collected for each beam profile. Each spectra had an integration time of 0.2 seconds which, when summed, resulted in an overall exposure time of 25 seconds. Two separate spectral measurements were taken for each beam profile, one with a single polymer sphere present and one background measurement when the polymer sphere removed. The Raman scattering signal was obtained by subtracting the two spectra. FIG. 4 shows the summed spectra 150 for all three profiles when the polymer sphere was present.

In each of the spectra 150 of FIG. 4 a large Raman scattering signal is observed at 1000 cm$^{-1}$ with all remaining Raman peaks being largely swamped by fluorescence. However, both the LG and holey-Gaussian beam profiles observe far less background fluorescence (3.4 and 2.2 times less respectively) with only a very small reduction in the overall Raman signal. This can especially be seen from the large fluorescence peak at ~1400 cm$^{-1}$ which, with a Gaussian profile, is significantly larger than the Raman peak at 1000 cm$^{-1}$. When looking at both the LG and holey-Gaussian however, the reduction in fluorescence allows the Raman signal to become the largest spectral component.

Figure 5:
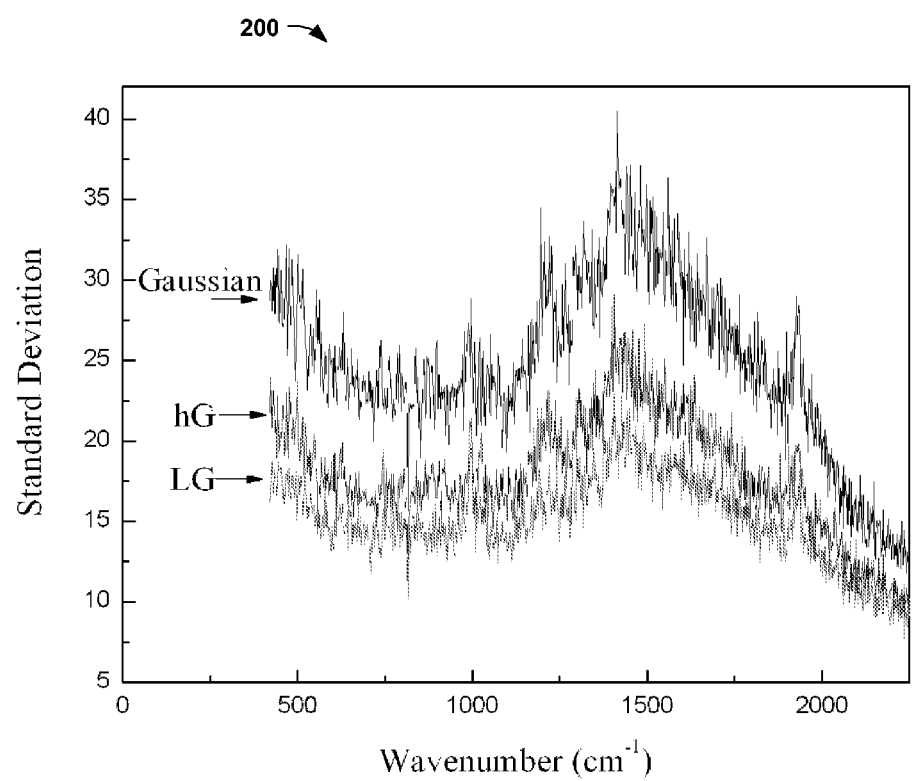
FIG. 5 shows the standard deviation of each spectral component for the spectra of FIG. 4.

The noise present upon the resulting Raman signal is directly related to the amount of background fluorescence present. This correlation is evident in FIG. 5, which shows the standard deviation 200 of each spectral component. This demonstrates how large amounts of fluorescence directly add noise to the Raman signal. For both LG and holey Gaussian, the reduced amount of fluorescence allows less noise to be passed onto the Raman signal.

Figure 6:
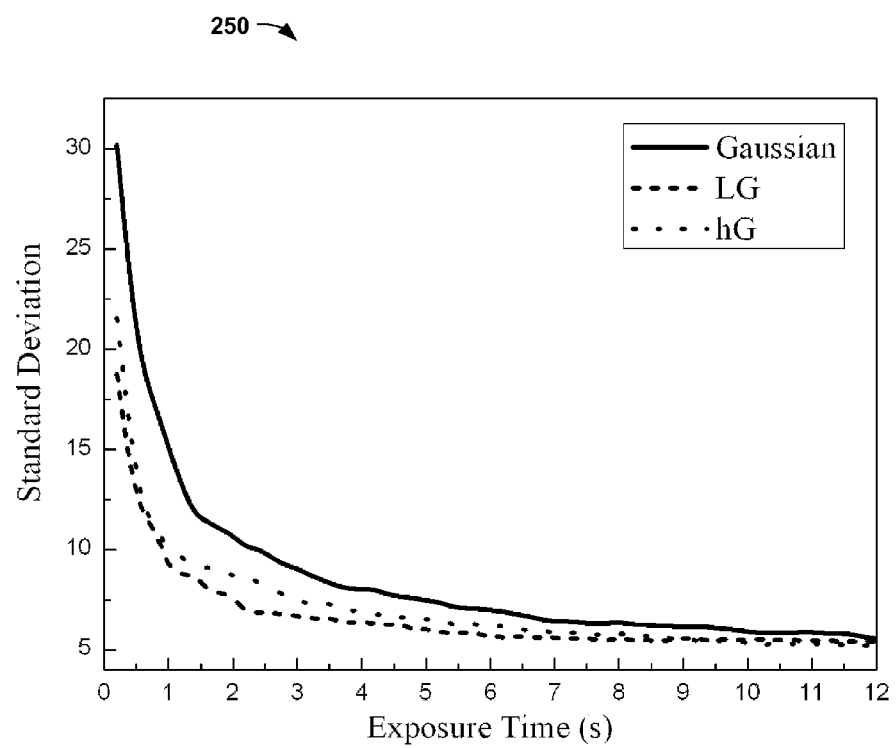
FIG. 6 shows the standard deviation of the Raman signal with respect to acquisition time.

FIG. 6 illustrates the importance of reducing this noise. This shows the standard deviation 250 of the Raman signal with respect to acquisition time. From this, it is clear that both annular beam profiles provide cleaner Raman measurements faster than a Gaussian configuration. This allows smaller Raman peaks to be distinguished from noise using a significantly reduced acquisition time. This is important if Raman is to become a practical experimental technique in areas such as for medical diagnostics.

As well as Laguerre-Gaussian beams and holey Gaussian beams, other specially engineered beams could be used, for example a Bessel beam. This can be created in various ways, for example using a conical shaped optical element (axicon). These beams maintain their cross-section intensity profile over a distance much longer than the equivalent Gaussian and Laguerre-Gaussian beam. The non zero-th order of a Bessel beam is composed of multiple concentric rings exhibiting the same dark region in the centre of the beam as the Laguerre-Gaussian beam while their focussed propagation distance is many times larger. This property improves the optical setup by reducing the focussing requirements of the excitation beam into the sample and by larger excitation volume.

Figure 7:
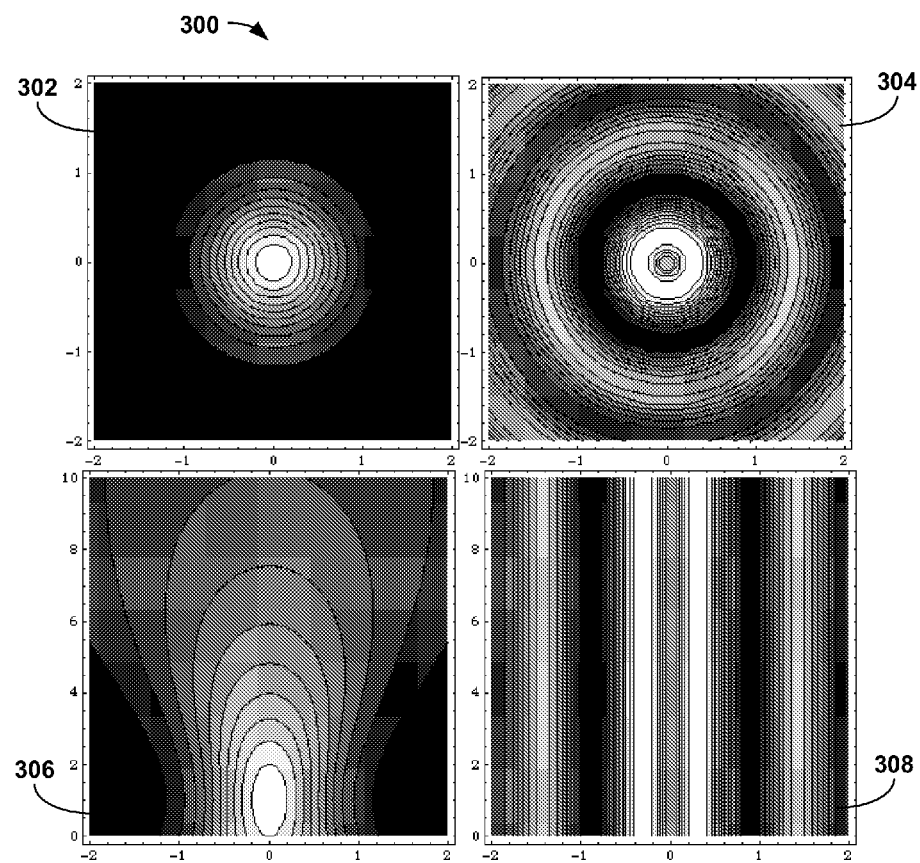
FIG. 7 shows various diagrammatic representations comparing the cross-sections of a Gaussian beam with the cross-sections of a Bessel beam.

FIG. 7 compares the cross-sections 300 of a Gaussian beam 302 with the cross-sections of a Bessel beam 304. It shows that, while the Bessel beam has a low intensity region in its centre that is useful to suppress the background fluorescence, the it also has a much deeper focal region making the collection of the Raman signal easier. The top figures show the transversal cross-section of the Gaussian (left) and Bessel beam (right) 302 and 304 and the bottom pair the respective longitudinal cross-sections 306 and 308.

A skilled person will appreciate that variations of the disclosed arrangements are possible without departing from the invention. For example although the invention has been described primarily with reference to a holey Gaussian or a LG beam in Raman configuration, in fact any specifically engineered spatial beam profile originating from a coherent or partially coherent light source optimizing the signal to noise ratio of the detected spectroscopic optical signal could be used.

The excitation source includes for example continuous wave or pulsed lasers and broadband/super-continuum sources. The specific engineering of beams can be achieved for example, by phase and amplitude holographic techniques, bulk optical elements such as cylindrical lenses and axicons as well as phase and amplitude masks. These special beam profiles can include Laguerre-Gaussian, holey-Gaussian, Bessel beams, Hermite-Gaussian beams and, in general, any superposition of coherent or partially coherent beam that improves the signal to noise ratio. This improvement of the signal to noise ratio can be obtained by increasing the signal level, decreasing the background signal regardless of its origin within the optical arrangement and/or the sample as well as decreasing the noise level.

The spectral configuration encompasses experiments using arrangements containing for example, high numerical objective lenses that tightly focus the excitation beam. Such applications can include Raman scattering, tip-enhanced Raman scattering (TERS), Surface-enhanced Raman scattering (SERS), Fluorescence microscopy, multi-photon microscopy and frequency generation such as non-generate four wave mixing. These techniques can be used to spectrally characterize samples that include fixed or living cells, and chemical and colloid solutions.

Accordingly the above description of the specific embodiment is made by way of example only and not for the purposes of limitation. It will be clear to the skilled person that minor modifications may be made without significant changes to the operation described.

The invention claimed is:

1. A Raman spectroscopy method for collecting a Raman signal with reduced noise or background fluorescence, the method comprising:
    exciting a Raman signal by illuminating a sample using a laser beam that is shaped so that an maximum intensity of the laser beam propagates away from a spectroscopic optical axis, wherein the laser beam is one of a Laguerre Gaussian beam, a Hermite-Gaussian beam, and a Bessel beam; and
    collecting a Raman signal from the sample.

2. A Raman spectroscopy system comprising:
    a laser configured to excite a Raman signal by illuminating a sample using a laser beam that is shaped so that an maximum intensity of the laser beam propagates away from a spectroscopic optical axis, wherein the laser beam is one of a Laguerre Gaussian beam, a Hermite-Gaussian beam, and a Bessel beam, and
    a spectrometer configured to collect a Raman signal from the sample.

3. A method as claimed in claim 1 comprising shaping the laser beam prior to it passing through one or more focusing elements for focusing it onto the sample.

4. A method as claimed in claim 1 comprising shaping the laser beam to be annular.

5. A method as claimed in claim 1 comprising shaping the laser beam to have a dark spot at its centre.

6. A method as claimed in claim 1 wherein the Raman spectroscopy is one of: Raman scattering, tip-enhanced Raman scattering (TERS), Surface-enhanced Raman scattering (SERS).

7. A system as claimed in claim 2 wherein the shaped laser beam has a dark spot at its centre.

8. A system as claimed in claim 2 wherein the shaped laser beam is annular.

9. A system as claimed in claim 2 configured to measure one or more of Raman scattering, tip-enhanced Raman scattering (TERS), Surface-enhanced Raman scattering (SERS).

* * * * *